United States Patent
Chu et al.

(10) Patent No.: US 9,870,229 B2
(45) Date of Patent: Jan. 16, 2018

(54) INDEPENDENT MAPPING OF THREADS

(71) Applicant: International Business Machines Corporation, Armonk, NY (US)

(72) Inventors: Sam G. Chu, Round Rock, TX (US); Markus Kaltenbach, Holzgerlingen (DE); Hung Q. Le, Austin, TX (US); Jentje Leenstra, Bondorf (DE); Jose E. Moreira, Irvington, NY (US); Dung Q. Nguyen, Austin, TX (US); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 170 days.

(21) Appl. No.: 14/869,305

(22) Filed: Sep. 29, 2015

(65) Prior Publication Data

US 2016/0092276 A1    Mar. 31, 2016

Related U.S. Application Data

(63) Continuation of application No. 14/501,152, filed on Sep. 30, 2014, now Pat. No. 9,720,696.

(51) Int. Cl.
*G06F 9/30* (2006.01)
*G06F 9/38* (2006.01)
(Continued)

(52) U.S. Cl.
CPC .......... *G06F 9/3836* (2013.01); *G06F 9/3012* (2013.01); *G06F 9/3851* (2013.01);
(Continued)

(58) Field of Classification Search
CPC ............. G06F 9/30149; G06F 9/30152; G06F 9/3836; G06F 9/3851; G06F 9/5061;
(Continued)

(56) References Cited

U.S. PATENT DOCUMENTS

| 4,858,113 A | 8/1989 | Saccardi |
| 5,055,999 A | 10/1991 | Frank et al. |

(Continued)

FOREIGN PATENT DOCUMENTS

| CN | 101021778 A | 8/2007 |
| CN | 101676865 A | 3/2010 |

(Continued)

OTHER PUBLICATIONS

Eisen et al., "Parallel Slice Processor With Dynamic Instruction Stream Mapping Background of the Invention", U.S. Appl. No. 14/274,927, filed May 12, 2014.

(Continued)

*Primary Examiner* — Daniel Pan
(74) *Attorney, Agent, or Firm* — Mitch Harris, Atty at Law, LLC; Andrew M. Harris; Robert R. Williams

(57) ABSTRACT

Embodiments of the present invention provide systems and methods for mapping the architected state of one or more threads to a set of distributed physical register files to enable independent execution of one or more threads in a multiple slice processor. In one embodiment, a system is disclosed including a plurality of dispatch queues which receive instructions from one or more threads and an even number of parallel execution slices, each parallel execution slice containing a register file. A routing network directs an output from the dispatch queues to the parallel execution slices and the parallel execution slices independently execute the one or more threads.

9 Claims, 5 Drawing Sheets

(51) Int. Cl.
*G06F 9/46* (2006.01)
*G06F 9/50* (2006.01)

(52) U.S. Cl.
CPC .......... *G06F 9/3891* (2013.01); *G06F 9/5061* (2013.01); *G06F 9/3802* (2013.01); *G06F 9/3814* (2013.01); *G06F 9/3855* (2013.01); *G06F 9/3885* (2013.01); *G06F 9/5066* (2013.01); *G06F 2209/5018* (2013.01)

(58) Field of Classification Search
CPC .... G06F 9/3802; G06F 9/3814; G06F 9/3855; G06F 9/3885; G06F 9/5066; G06F 9/5077; G06F 9/5083; G06F 2209/503; G06F 2209/504; G06F 2209/5018; G06F 9/3012; G06F 9/3891
USPC .......... 712/206, 207, 215, 210; 718/104–108
See application file for complete search history.

(56) References Cited

U.S. PATENT DOCUMENTS

| | | | |
|---|---|---|---|
| 5,095,424 A | 3/1992 | Woffinden et al. | |
| 5,471,593 A | 11/1995 | Branigin | |
| 5,475,856 A | 12/1995 | Kogge | |
| 5,553,305 A | 9/1996 | Gregor et al. | |
| 5,630,149 A | 5/1997 | Bluhm | |
| 5,680,597 A | 10/1997 | Kumar et al. | |
| 5,822,602 A | 10/1998 | Thusoo | |
| 6,026,478 A * | 2/2000 | Dowling | G06F 9/3842 712/215 |
| 6,044,448 A | 3/2000 | Agrawal et al. | |
| 6,073,215 A | 6/2000 | Snyder | |
| 6,073,231 A | 6/2000 | Bluhm et al. | |
| 6,092,175 A | 7/2000 | Levy et al. | |
| 6,112,019 A | 8/2000 | Chamdani et al. | |
| 6,119,203 A | 9/2000 | Snyder et al. | |
| 6,138,230 A | 10/2000 | Hervin et al. | |
| 6,145,054 A | 11/2000 | Mehrotra et al. | |
| 6,170,051 B1 | 1/2001 | Dowling | |
| 6,212,544 B1 | 4/2001 | Borkenhagen et al. | |
| 6,237,081 B1 | 5/2001 | Le et al. | |
| 6,286,027 B1 | 9/2001 | Dwyer, III et al. | |
| 6,311,261 B1 | 10/2001 | Chamdani et al. | |
| 6,336,183 B1 | 1/2002 | Le et al. | |
| 6,356,918 B1 | 3/2002 | Chuang et al. | |
| 6,381,676 B2 | 4/2002 | Aglietti et al. | |
| 6,425,073 B2 | 7/2002 | Roussel et al. | |
| 6,463,524 B1 | 10/2002 | Delaney et al. | |
| 6,487,578 B2 | 11/2002 | Ranganathan | |
| 6,549,930 B1 | 4/2003 | Chrysos et al. | |
| 6,564,315 B1 | 5/2003 | Keller et al. | |
| 6,728,866 B1 | 4/2004 | Kahle et al. | |
| 6,732,236 B2 | 5/2004 | Favor | |
| 6,847,578 B2 | 1/2005 | Ranganathan | |
| 6,868,491 B1 | 3/2005 | Moore | |
| 6,883,107 B2 | 4/2005 | Rodgers et al. | |
| 6,944,744 B2 | 9/2005 | Ahmed et al. | |
| 6,948,051 B2 | 9/2005 | Rivers et al. | |
| 6,954,846 B2 | 10/2005 | Leibholz et al. | |
| 6,978,459 B1 | 12/2005 | Dennis et al. | |
| 7,020,763 B2 | 3/2006 | Saulsbury et al. | |
| 7,024,543 B2 | 4/2006 | Grisenthwaite et al. | |
| 7,086,053 B2 | 8/2006 | Long et al. | |
| 7,093,105 B2 | 8/2006 | Webb, Jr. et al. | |
| 7,100,028 B2 | 8/2006 | McGrath et al. | |
| 7,114,163 B2 | 9/2006 | Hardin et al. | |
| 7,124,160 B2 | 10/2006 | Saulsbury et al. | |
| 7,155,600 B2 | 12/2006 | Burky et al. | |
| 7,191,320 B2 | 3/2007 | Hooker et al. | |
| 7,263,624 B2 | 8/2007 | Marchand et al. | |
| 7,290,261 B2 | 10/2007 | Burky et al. | |
| 7,302,527 B2 | 11/2007 | Barrick et al. | |
| 7,386,704 B2 | 6/2008 | Schulz et al. | |
| 7,395,419 B1 * | 7/2008 | Gonion | G06F 8/443 712/241 |
| 7,398,374 B2 | 7/2008 | DeLano | |
| 7,469,318 B2 | 12/2008 | Chung et al. | |
| 7,478,198 B2 * | 1/2009 | Latorre | G06F 1/32 711/100 |
| 7,478,225 B1 | 1/2009 | Brooks et al. | |
| 7,490,220 B2 | 2/2009 | Balasubramanian et al. | |
| 7,512,724 B1 | 3/2009 | Dennis et al. | |
| 7,565,652 B2 | 7/2009 | Janssen et al. | |
| 7,600,096 B2 | 10/2009 | Parthasarathy et al. | |
| 7,669,035 B2 | 2/2010 | Young et al. | |
| 7,669,036 B2 | 2/2010 | Brown et al. | |
| 7,694,112 B2 | 4/2010 | Barowski et al. | |
| 7,707,390 B2 | 4/2010 | Ozer et al. | |
| 7,721,069 B2 | 5/2010 | Ramchandran et al. | |
| 7,793,278 B2 | 9/2010 | Du et al. | |
| 7,836,317 B2 | 11/2010 | Marchand et al. | |
| 7,889,204 B2 | 2/2011 | Hansen et al. | |
| 7,890,735 B2 | 2/2011 | Tran | |
| 7,926,023 B2 | 4/2011 | Okawa et al. | |
| 7,975,134 B2 | 7/2011 | Gonion | |
| 7,987,344 B2 | 7/2011 | Hansen et al. | |
| 8,046,566 B2 | 10/2011 | Abernathy et al. | |
| 8,074,224 B1 | 12/2011 | Nordquist et al. | |
| 8,099,556 B2 | 1/2012 | Ghosh et al. | |
| 8,103,852 B2 | 1/2012 | Bishop et al. | |
| 8,108,656 B2 | 1/2012 | Katragadda et al. | |
| 8,135,942 B2 | 3/2012 | Abernathy et al. | |
| 8,140,832 B2 * | 3/2012 | Mejdrich | G06F 9/30174 712/227 |
| 8,141,088 B2 | 3/2012 | Morishita et al. | |
| 8,166,282 B2 | 4/2012 | Madriles et al. | |
| 8,219,783 B2 | 7/2012 | Hara | |
| 8,250,341 B2 | 8/2012 | Schulz et al. | |
| 8,335,892 B1 | 12/2012 | Minkin et al. | |
| 8,386,751 B2 | 2/2013 | Ramchandran et al. | |
| 8,412,914 B2 | 4/2013 | Gonion | |
| 8,464,025 B2 | 6/2013 | Yamaguchi et al. | |
| 8,489,791 B2 | 7/2013 | Byrne et al. | |
| 8,555,039 B2 | 10/2013 | Rychlik | |
| 8,656,401 B2 | 2/2014 | Venkataramanan et al. | |
| 8,683,182 B2 | 3/2014 | Hansen et al. | |
| 8,713,263 B2 | 4/2014 | Bryant | |
| 8,850,121 B1 | 9/2014 | Ashcraft et al. | |
| 8,966,232 B2 | 2/2015 | Tran | |
| 8,984,264 B2 | 3/2015 | Karlsson et al. | |
| 9,223,709 B1 | 12/2015 | O'Bleness et al. | |
| 9,519,484 B1 | 12/2016 | Stark | |
| 9,720,696 B2 * | 8/2017 | Chu | G06F 9/5061 |
| 2002/0194251 A1 | 12/2002 | Richter et al. | |
| 2003/0120882 A1 * | 6/2003 | Granston | G06F 9/325 711/169 |
| 2004/0111594 A1 | 6/2004 | Feiste et al. | |
| 2004/0216101 A1 | 10/2004 | Burky et al. | |
| 2006/0095710 A1 | 5/2006 | Pires Dos Reis Moreira et al. | |
| 2007/0022277 A1 | 1/2007 | Iwamura et al. | |
| 2008/0133885 A1 | 6/2008 | Glew | |
| 2009/0037698 A1 | 2/2009 | Nguyen | |
| 2009/0113182 A1 | 4/2009 | Abernathy et al. | |
| 2010/0100685 A1 | 4/2010 | Kurosawa et al. | |
| 2012/0110271 A1 | 5/2012 | Boersma et al. | |
| 2012/0246450 A1 | 9/2012 | Abdallah | |
| 2014/0215189 A1 | 7/2014 | Airaud et al. | |
| 2014/0244239 A1 | 8/2014 | Nicholson et al. | |
| 2015/0134935 A1 | 5/2015 | Blasco | |

FOREIGN PATENT DOCUMENTS

| | | |
|---|---|---|
| CN | 101876892 A | 11/2010 |
| CN | 102004719 A | 4/2011 |

OTHER PUBLICATIONS

Gebhart et al., "A Hierarchical Thread Scheduler and Register File for Energy-Efficient Throughput Processors", ACM Transactions on Computer Systems, vol. 30, No. 2, Article 8, Publication date: Apr. 2012, pp. 8:1-8:38, © 2012 ACM, <http://doi.acm.org/10.1145/2166879.2166882>.

(56) References Cited

OTHER PUBLICATIONS

"Method and system for Implementing "Register Threads" in a Simultaneously-Multithreaded (SMT) Processor Core", An IP.com Prior Art Database Technical Disclosure, Authors et. al.: Disclosed Anonymously, IP.com No. IPCOM000199825D, IP.com Electronic Publication: Sep. 17, 2010, pp. 1-4, <http://ip.com/IPCOM/000199825>.
U.S. Appl. No. 15/442,810, filed Feb. 27, 2017, Eisen, et al.
List of IBM Patents or Patent Applications Treated as Related, 3 pages.
Office Action in U.S. Appl. No. 14/501,152 dated Sep. 30, 2016, 20 pages (pp. 1-20 in pdf).
U.S. Appl. No. 14/723,940, filed May 28, 2015, Eisen, et al.
U.S. Appl. No. 14/724,073, filed May 28, 2015, Brownscheidle, et al.
U.S. Appl. No. 14/724,268, filed May 28, 2015, Ayub, et al.
U.S. Appl. No. 14/480,680, filed Sep. 9, 2014, Boersma, et al.
U.S. Appl. No. 14/501,152, filed Sep. 30, 2014, Chu, et al.
U.S. Appl. No. 14/274,942, filed May 12, 2014, Eisen, et al.
U.S. Appl. No. 14/302,589, filed Jun. 12, 2014, Eisen, et al.
U.S. Appl. No. 14/300,563, filed Jun. 10, 2014, Eisen, et al.
U.S. Appl. No. 14/594,716, filed Jan. 12, 2015, Eisen, et al.
U.S. Appl. No. 14/595,549, filed Jan. 13, 2015, Brownscheidle, et al.
U.S. Appl. No. 14/595,635, filed Jan. 13, 2015, Ayub, et al.
U.S. Appl. No. 14/574,644, filed Dec. 18, 2014, Boersma, et al.
U.S. Appl. No. 14/274,927, filed May 12, 2014, Eisen, et al.
Pechanek, et al., "ManArray Processor Interconnection Network: An Introduction", Euro-Par' 99 Parallel Processing, Lecture Notes in Computer Science, $5^{th}$ International Euro-Par Conference, Aug. 31-Sep. 3, 1999 Proceedings, pp. 761-765, vol. 1685, Spring Berlin Heidelberg, Toulouse, France.
Pechanek, et al., "The ManArray Embedded Processor Architecture",Proceedings of the $26^{th}$ Euromicro Conference, IEEE Computer Society, Sep. 5-7, 2000, pp. 348-355, vol. 1, Maastricht.
Czajkowski, et al., "Resource Management for Extensible Internet Servers", Proceedings of the $8^{th}$ ACM SIGOPS European Workshop on Support for Composing Distributed Applications, Sep. 1998, pp. 33-39, ACM, Portugal.
Bridges, et al., "A CPU Utilization Limit for Massively Parallel Mimd Computers", Fourth Symposium on the Frontiers of Massively Parallel Computing, Oct. 19-21, 1992, pp. 83-92, IEEE, VA, US.
Notice of Allowance in U.S. Appl. No. 14/501,152 dated Mar. 24, 2017, 10 pages (pp. 1-10 in pdf).
Gebhart et al., "A Hierarchical Thread Scheduler and Register File for Energy-Efficient Throughput Processors", ACM Transactions on Computer Systems, Apr. 2012, pp. 8:1-8:38, (38 pages in pdf),vol. 30, No. 2, Article 8, ACM.

* cited by examiner

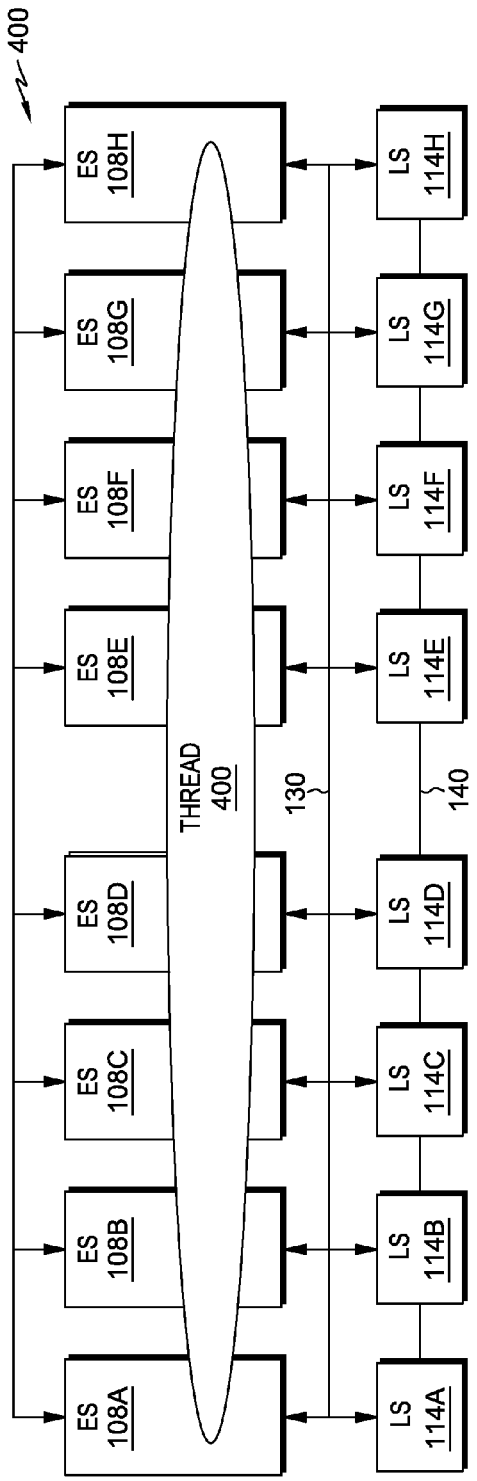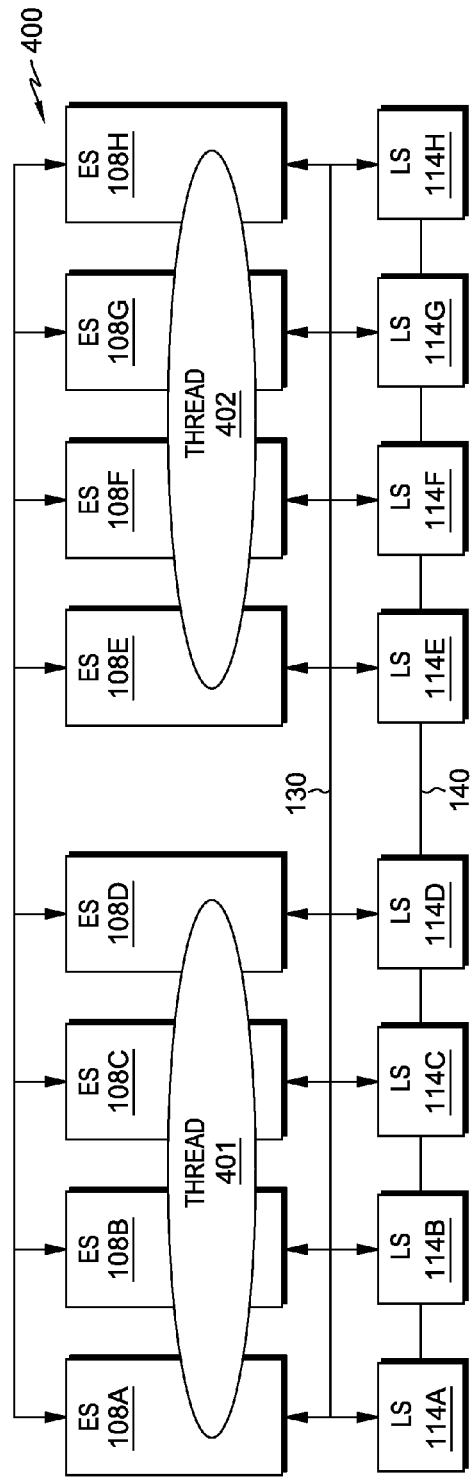

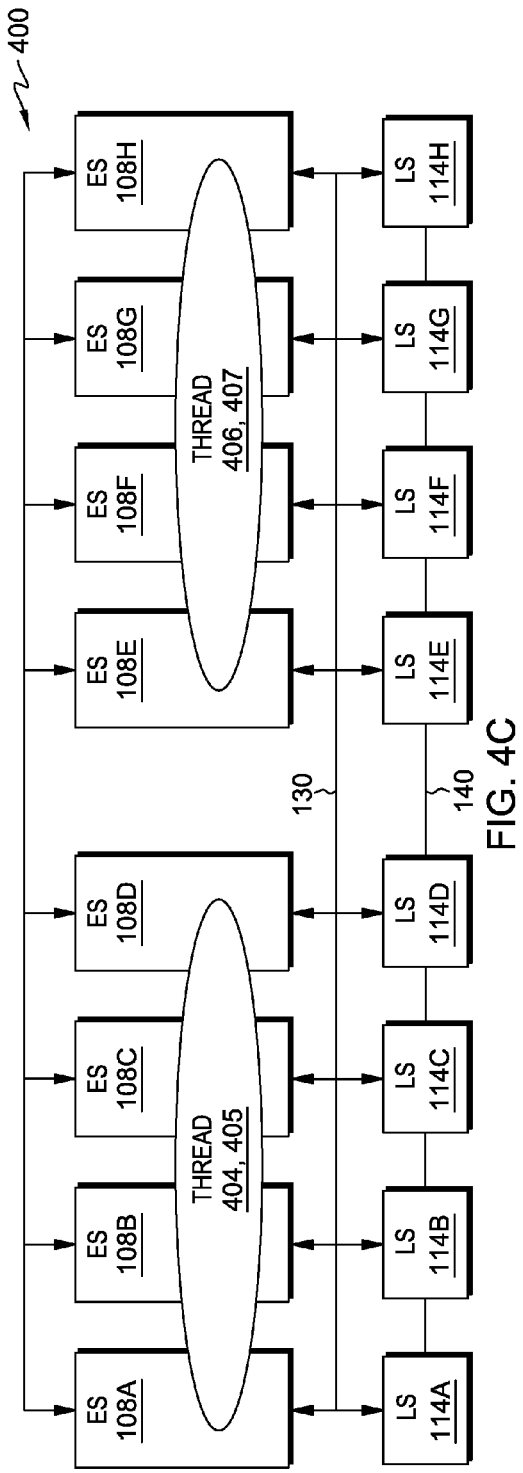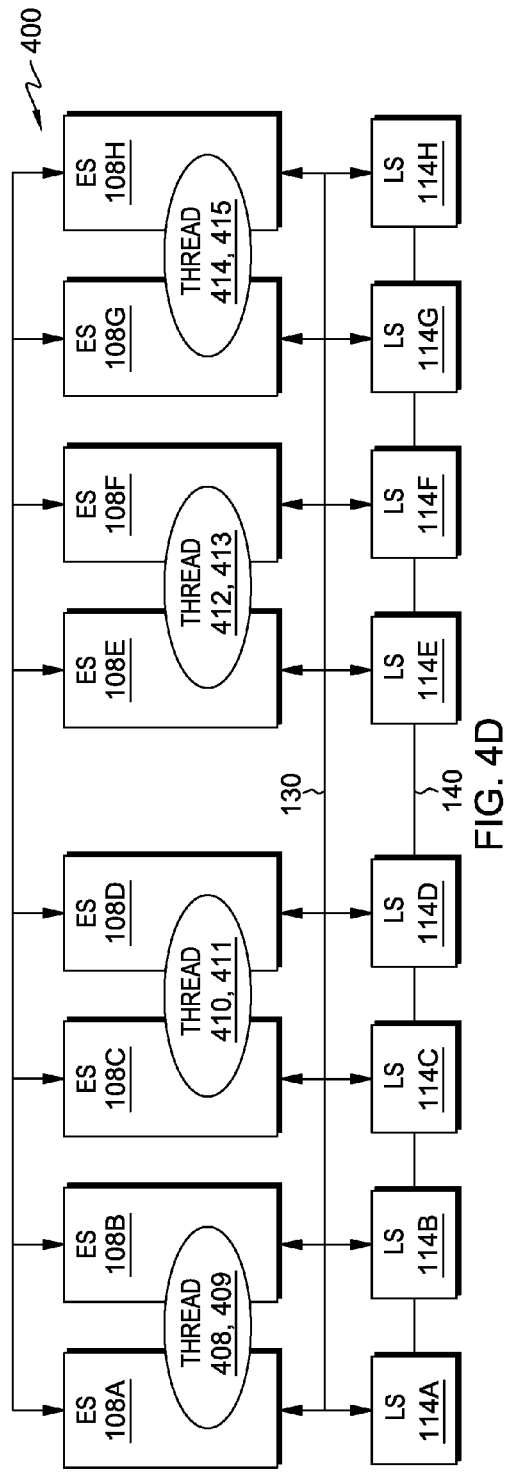

INDEPENDENT MAPPING OF THREADS

BACKGROUND OF THE INVENTION

The present invention relates generally to the field of processors, and more particularly to the independent mapping of threads over parallel slices in a processor core.

Register files are a means of memory storage within a central processing unit of a computing device and may be used for storing architectural state information, among other information and data. The architectural state information may include instructions, operands, and addresses. Each register file may store the architectural state and future state information for one or more threads, or sequence of programmed instructions.

In some processors, the register file is a centralized component of the execution units, and is able to supply all of the register file data to its connected execution units in both single thread (ST) and simultaneous multi-threading (SMT) modes. In these processors, if the register file gets too large, a second level of storage may often be added.

SUMMARY

According to one embodiment of the present invention, a processor core is provided, the processor core comprising: a plurality of dispatch queues, wherein the plurality of dispatch queues are configured to receive instructions associated with a plurality of threads; an even plurality of parallel execution slices, wherein each of the even plurality of execution slices includes a register file; and a routing network configured to direct an output of the plurality of dispatch queues to the even plurality of parallel execution slice, wherein the even plurality of execution slices are configured to independently execute a plurality of threads.

According to another embodiment of the present invention, a method is provided, the method comprising: receiving, from a dispatch queue, a first number of threads; allocating, by a network, the received first number of threads to a first even plurality of parallel execution slices; executing the first number of threads on the first even plurality of parallel execution slices; writing results of the execution of the first number of threads to a set of register files associated with the first even plurality of parallel execution slices; receiving, from the dispatch queue, a second number of threads; allocating, by the network, the received second number of threads to a second even plurality of parallel execution slices; executing the second number of threads on the second even plurality of execution slices; and writing results of the execution of the second number of threads to a set of register files associated with the second even plurality of parallel execution slices.

BRIEF DESCRIPTION OF THE DRAWINGS

FIGS. 4A-D are examples of sharing resources when a different number of threads are mapped to execution slices, in accordance with an embodiment of the present invention.

DETAILED DESCRIPTION

In some processors, such as processors having a multi-slice processor architecture, many execution slices are connected in parallel making a centralized register file more difficult to implement. The number of ports and entries needed for a centralized register file is extensive, leading to a large amount of wires to send to the distributed execution slices. Embodiments of the present invention provide systems and methods for mapping the architected state of one or more threads to a set of distributed physical register files to enable independent execution of one or more threads in a multiple slice processor.

Figure 1:
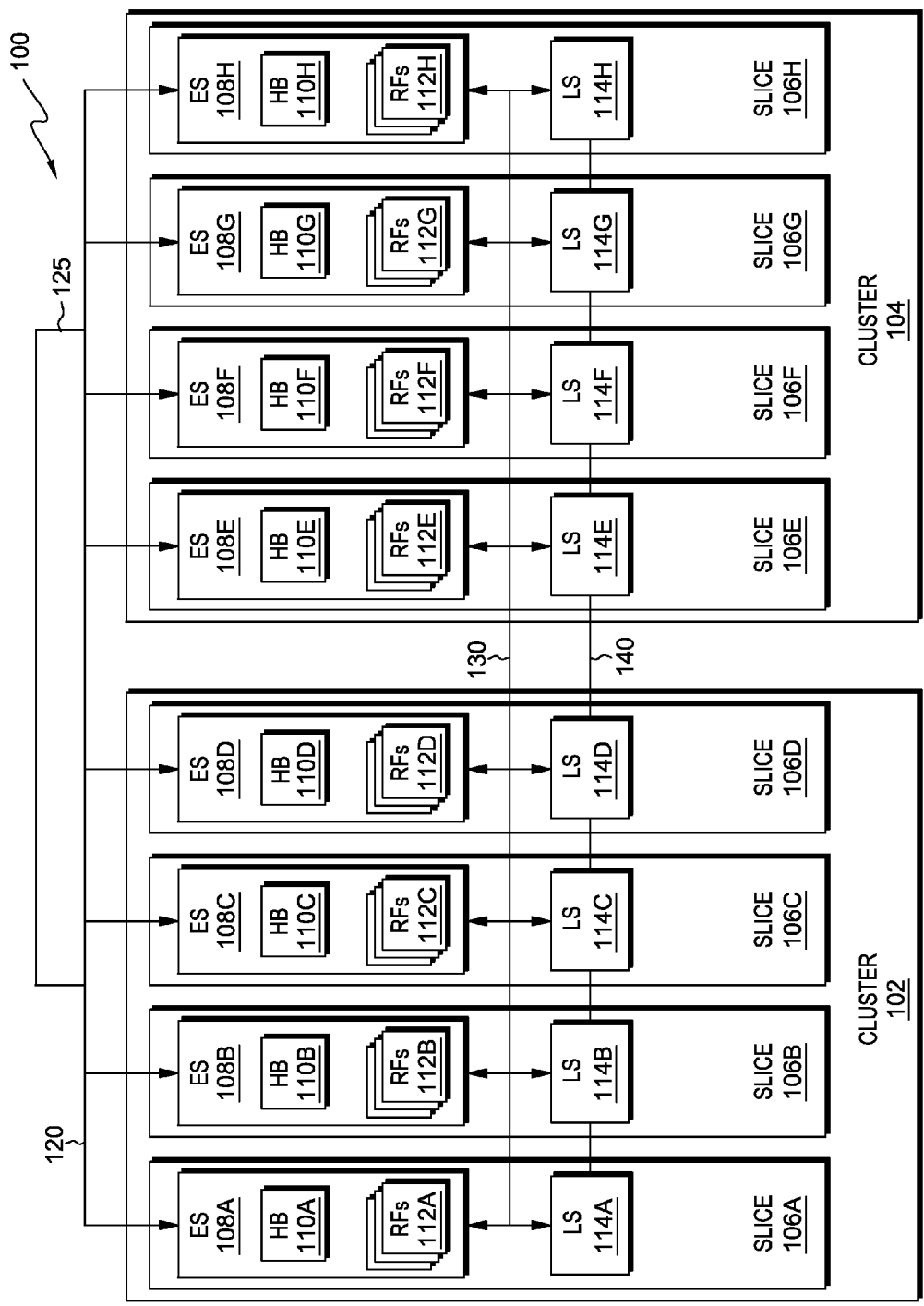
FIG. 1 is a block diagram illustrating an example of a processor core environment, in accordance with an embodiment of the present invention.

The present invention will now be described in detail with reference to the Figures. FIG. 1 is a block diagram illustrating an example of a processor core environment, generally designated 100, in accordance with one embodiment of the present invention. Modifications to processor core environment 100 may be made by those skilled in the art without departing from the scope of the invention as recited by the claims.

In this exemplary embodiment, processor core environment 100 includes two clusters: cluster 102, containing four processor slices (slices 106A-D); and cluster 104 containing four processor slices (slices 106E-H). In other embodiments, processor core environment 100 may contain any number of clusters (a grouping of processor slices) which support the functionality of processor core environment 100. In this exemplary embodiment, each slice 106A-H is a 64 bit processor slice, and two slices (a "superslice") are the smallest unit which maintains the minimum functionality of the processor core. In other embodiments, any number of processor slices which maintain the minimum functionality of the processor core may be implemented.

Each slice 106A-H contains ES (execution slices) 108A-H and LS (load store) slices 114A-H, respectively. Each slice 106A-H receives instructions from dispatch queue 125 via dispatch routing network 120. Dispatch queue 125 may be one or more dispatch queues which receive multiple instruction streams and store the instruction streams until the control logic of the processor core instructs the instruction streams to be sent to execution slices 108A-H, via dispatch routing network 120. Execution slices 108A-H perform sequencing and execution of logical, mathematical, and other operations as needed to perform the execution of instruction streams. The execution results are sent to each of execution slices 108A-H by write back bus 130. Execution slices 108A-H are coupled to load store slices 114A-H and results of execution by load store slices 114A-H are sent to each of execution slices 108A-H by write back bus 130. Write back bus 130 may have a dedicated bus for each execution result of each of execution slices 108A-H next to the dedicated bus of each of load store slices 114A-H, or the bus may be shared between execution slices 108A-H and load store slices 114A-H, which requires arbitration to prevent result write collisions at write back bus 130. Load store slices 114A-H perform operations to maintain cache consistency. Each of load store slices 114A-H are coupled by load store routing network 140, which provides conversion transfers for execution of SIMD instructions, processing of instructions with data width greater than the width of one of load store slices 114A-H, and other operations requiring translation or realignment of data between load store slices 114A-H.

Execution slices 108A-H each contain history buffers 110A-H and register files 112A-H, respectively. History buffers 110A-H are used for recovery, and provide restore capabilities for register targets of instructions executed by execution slices 108A-H. Register files 112A-H are physical processor registers which store the architected states and future states for instruction streams. In this exemplary embodiment, the architected state when mapping two instruction threads to two processor slices is 96 total registers per thread.

Figure 2:
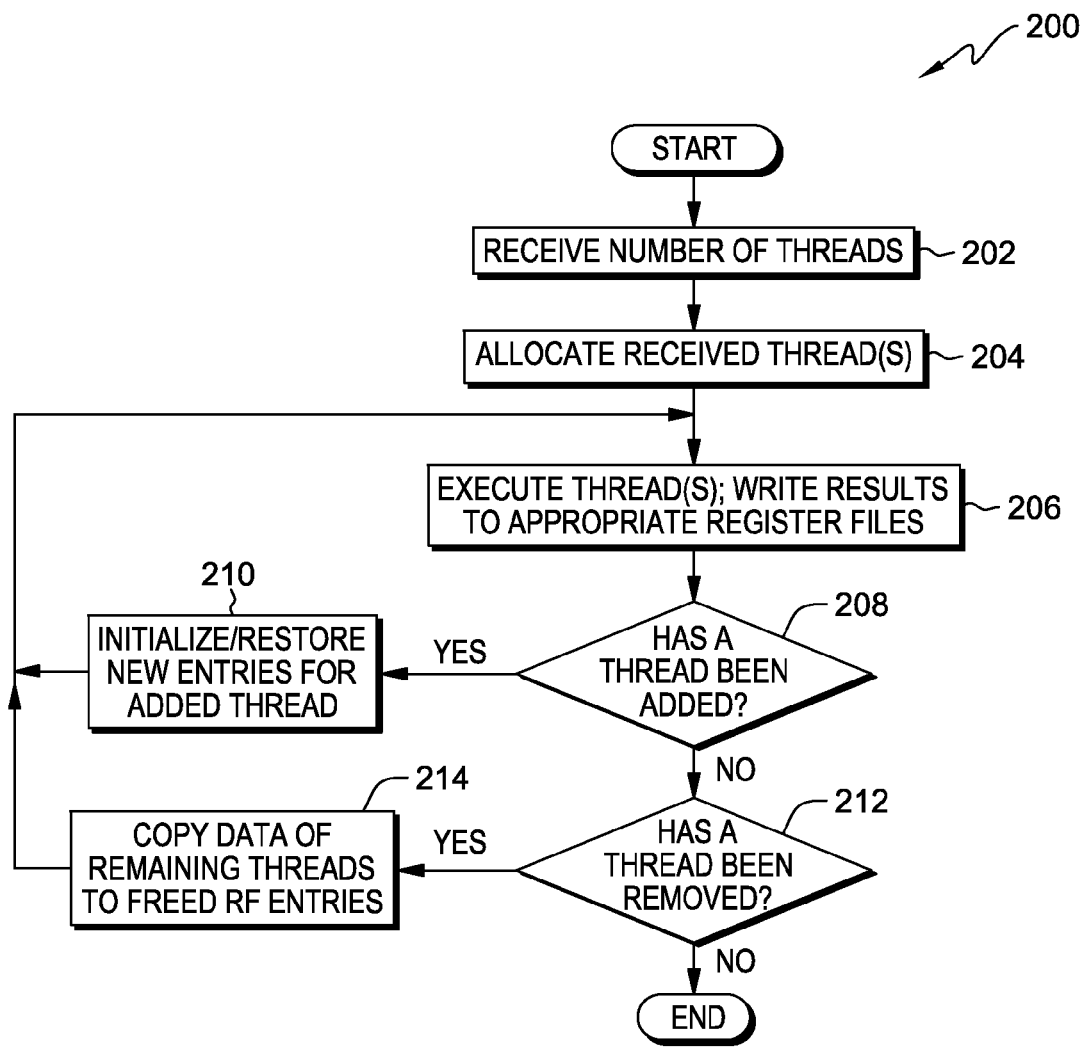
FIG. 2 is a flowchart depicting operational steps for mapping different numbers of threads, each containing an architected register state, to physical register files, in accordance with an embodiment of the present invention.

FIG. 2 is a flow chart depicting operational steps for mapping different numbers of threads, each containing an architected register state, to physical register files 112A-H, in accordance with an embodiment of the present invention.

In step 202, the resources of a processor core receive a number of instruction sequences (threads). In this exemplary embodiment, the received number of threads to map on the processor core is a factor external to the processor core, decided by the software running on the processor and the environment in which the software is running. In this exemplary embodiment, the software determines whether one, two, four, or eight threads are mapped to the physical register files 112A-H. The software determination to map one number of threads is not more likely to occur than any other supportable number of threads to map. In other embodiments, the software may decide to map any number of threads that may be supported by the microarchitecture and resources of the processor core.

In step 204, the received number of threads are allocated to one or more processor slices 106A-H, within the processor core. In this exemplary embodiment, the threads are allocated to the slices of a processor core dependent on the number of threads received and the available resources (depicted in detail in FIGS. 4A-D). In other embodiments, any number of threads received may be allocated in any manner which supports the independent execution of the received threads in the processor core.

In step 206, each allocated thread is executed and the results of execution are written to the physical register files to which the thread is allocated. In this exemplary embodiment, a thread is executed on one processor slice by sending load instructions to load store slices 114A-H. The load data results of the load execution are written to write back bus 130, so that the results of the execution are seen by each register file on each execution slice. The execution results are then written to each register file on the processor slices to which the thread is also mapped (depicted further in FIGS. 4A-D). In other embodiments, the thread state may be loaded in the register file slices in any other manner using load instructions, for example, by using a separate thread state memory from which the thread state can be directly loaded, instead of using load instructions executed by load store slices 114A-H.

In step 208, the resources of the processor core determine whether the software program requests to add an additional thread. For example, an event such as an interrupt may occur, causing the software to request an additional thread or threads to be added. If an additional thread or threads are added, then, in step 210, the resources of the processor core allocate register file entries for the newly added thread(s) (as in step 204) and initialize or restore new register file entries for the added thread(s). For example, if the program is running a single thread (ST) and the software decides to add a second thread (SMT2), then the second thread is allocated to a predetermined set of register file entries. New register file entries may be created for the added thread, or may be restored from previous register file entries stored in the memory, for the newly added second thread to proceed with execution in SMT2 mode.

If, in step 208, the resources of the processor core determine that a thread has not been added, then, in step 212, the resources of the processor core determine whether an existing thread is removed. For example, the software may decide to put one or more of the threads into a 'power save' mode, causing the one or more threads to go dormant after saving the architectural state. If, in step 212, the resources of the processor core determine that a thread has been removed by the software program, then, in step 214, the processor core allocates register file entries for the new, reduced number of threads, and the data of the remaining threads is copied to the newly freed register file entries. For example, if two threads are running, (one thread is mapped to register files 112A-D on slices 106A-D and the second thread is mapped to register files 112E-H on slices 106E-H) and the software decides that one thread should be removed, then one thread remains and the architected state of the remaining thread is mapped to each register file 112A-H on slices 106A-H. If, in step 212, the resources of the processor core determine that a thread has not been removed by the software program, then the operational steps end and the execution may begin, or continue, on the newly added thread(s). In other embodiments, the adding and deletion of threads may be combined into a single step in which the removed thread space is directly allocated to an added thread by combining steps 208, 210, 212, and 214.

Accordingly, by performing the operational steps of FIG. 2, a processor core manages the state of transition between the number of active instruction threads running on each processor slice upon receiving instructions to add or remove one or more threads.

Figure 3:
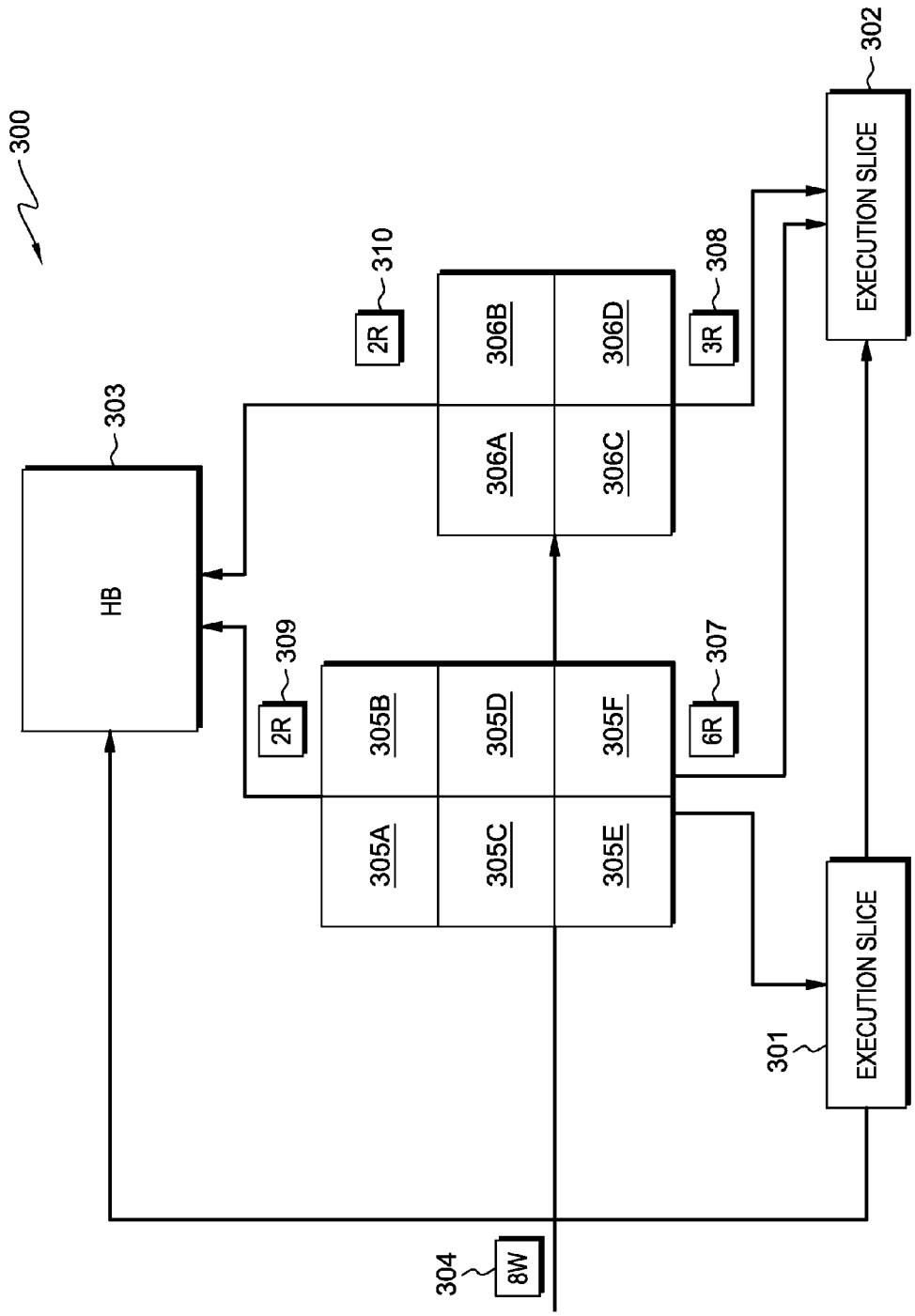
FIG. 3 is an example of a register file structure depicting the visible architected state on a processor slice pair to execute a set of instructions, in accordance with an embodiment of the present invention.

FIG. 3 is an example of a register file structure depicting the visible architected state on a processor slice pair ("superslice") to execute a set of instructions, in accordance with an embodiment of the present invention.

As depicted in FIG. 3, one processor slice pair is shown, where each of execution slice 301 and execution slice 302 are individual processor slices. In this exemplary embodiment, two threads are mapped to the register files of two execution slices (i.e., registers 305A-F on execution slice 301 and registers 306A-D on execution slice 302). Write bus 304 comprises eight write ports mapped to registers 305A-F, registers 306A-D, history buffer 303, and execution slices 301 and 302. Registers 305A, 305C, and 305E are exemplary registers for the architected state of a first thread, and registers 305B, 305D, and 305F are exemplary registers for the architected state of a second thread. In this exemplary embodiment, registers 305A-F are all visible to both execution slice 301 and 302, and may execute 64 bit wide instructions on either execution slice 301 or execution slice 302. Read bus 307 comprises six read ports, in which three of the read ports go to execution slice 301 and the other three read ports go to execution slice 302 (i.e., the results of thread execution are sent to both execution slice 301 and execution slice 302). Read bus 309 comprises two read ports which read out a copy of registers 305A-F to history buffer 303 during 64 bit wide instruction execution. Registers 306A and 306C are exemplary registers for the architected state of a first thread and registers 306B and 306D are exemplary registers for the architected state of a second thread. In this exemplary embodiment, registers 306A-D are all visible only to execution slice 302 and may execute 128 bit wide instructions over both execution slices 301 and 302, as registers 306A-D contain the second set of 64 bits used to execute 128 bit wide instructions (the first set of 64 bits are from registers 305A-F). Read bus 308 comprises three read ports read to execution slice 302, as only execution slice 302 sees this information (i.e., registers 306A-D). Read bus 310 comprises two read ports, which read a copy of registers 306A-D during 128 bit wide instruction execution to history buffer 303. Additionally, a copy of registers 305A-F is read to history buffer 303 via read port 309 during the execution of 128 bit wide instructions. In this exemplary embodiment, 64 bit wide instructions are executed on either execution slice 301 or execution slice 302, while 128 bit wide instructions are executed on both execution slice 301 and execution slice 302. In other embodiments, the system may be adapted to execute any size instruction on either execution slice (301 or 302) and/or may be programmed to execute some or all instructions on execution slice 301 and some or all instructions on execution slice 302.

Accordingly, by implementing the dual register file structure depicted in FIG. 3, one register file is used to execute 64 bit operations, and the pair of register files are used to execute 128 bit operations, reducing the overall amount of power and area consumed.

FIGS. 4A-D are examples of sharing resources when a different number of threads are mapped to execution slices 108A-H, in accordance with an embodiment of the present invention.

FIG. 4A depicts an example of mapping a single thread to all execution slices 108A-H. In this exemplary embodiment, when one thread (thread 400) is received, thread 400 is mapped to each register file of the eight execution slices 108A-H. A sequence of instructions may be executed by execution slices 108A-H, or load store slices 114A-H. Write back bus 130 takes the results produced by the execution of the one thread on one of execution slices 108A-H (the originating slice) and sends the results to each other execution slice, so that every execution slice 108A-H sees the results of the thread execution. For example, execution slice 108A may execute thread 400, and the results of the execution will be written to each of execution slices 108A-H, via write back bus 130. If the sequence of instructions is executed on one or more of load store slices 114A-H, connected by load store routing network 140 to provide transfers for the execution of none aligned load stores and SIMD instructions, then load store routing network 140 writes the result of the execution of the one thread to each slice, using write back bus 130, so that each of execution slices 108A-H sees the results of the execution.

FIG. 4B depicts an example of mapping two threads, each to a dedicated set of execution slices. In this exemplary embodiment, when two threads (thread 401 and thread 402) are received, thread 401 is mapped to each register file on execution slices 108A-D, and thread 402 is mapped to each register file on execution slices 108E-H. Thread 401 is executed on one processor slice, and the results are distributed to each of the other slices to which thread 401 is mapped. In this exemplary embodiment, write back bus 130 is cut, so that execution slices 108A-D communicate only with each other and execution slices 108E-H communicate only with each other. This eliminates the need for write back bus arbitration between execution slices 108A-D and execution slices 108E-H, as each set of execution slices may use separated parts of write back bus 130. Load store routing network 140 is also cut in a similar manner to write back bus 130, so that load store slices 114A-D communicate only with each other and load store slices 114E-H communicate only with each other. In this exemplary embodiment, threads 401 and 402 each use 50% of the total execution units.

FIG. 4C depicts an example of mapping four threads, each pair of the four threads mapped to a dedicated set of execution slices. In this exemplary embodiment, when four threads (threads 404, 405, 406, and 407) are received, the four threads are mapped to each register file in two pairs (i.e., two architected states are each mapped to a set of four slices). For example, threads 404 and 405 are mapped to each register file on execution slices 108A-D and threads 406 and 407 are mapped to each register file on execution slices 108E-H. In this exemplary embodiment, any of the threads can use resources of the processor slices to which it is mapped. This dynamic sharing is determined by structure availability and dependencies. In this exemplary embodiment, the results of a thread execution are shared with the other slices to which the thread is mapped. Write back bus 130 is cut, so that execution slices 108A-D communicate only with each other and execution slices 108E-H communicate only with each other. Load store routing network 140 is also cut in a similar manner to write back bus 130. In this exemplary embodiment, the two thread pairs (threads 404, 405 and threads 406, 407) each use 50% of the total execution units.

FIG. 4D depicts an example of mapping eight threads, each pair of the eight threads mapped to a dedicated set of execution slices. In this exemplary embodiment, when eight threads (threads 408, 409, 410, 411, 412, 413, 414, and 415) are received, the eight threads are mapped to each register file in four pairs. For example, threads 408 and 409 are mapped to each register file on execution slices 108A-B, threads 410 and 411 are mapped to each register file on execution slices 108C-D, threads 412 and 413 are mapped to each register file on execution slices 108E-F, and threads 414 and 415 are mapped to each register file on execution slices 108G-H. In this exemplary embodiment, write back bus 130 is cut, so that execution slices 108A-D communicate only with each other, and execution slices 108E-H communicate only with each other. Load store routing network 140 is also cut in a similar manner to write back bus 130. In this exemplary embodiment, each register file stores two threads, and the four thread pairs each use 25% of the total execution units. In other embodiments, write back bus 130 and load store routing network 140 may each be cut any number of times that may be supported by the architecture of a processor core and allows for the necessary communication between the components. For example, a cut in write back bus 130 may be advantageous when the cut removes commonly used busses used by multiple slices, which require arbitration before writing results to write back bus 130 and routing network 140.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by a plurality of dispatch queues, instructions of a first number of threads;

allocating, by a network, the received first number of threads to a first even plurality of parallel execution slices;

routing the instructions of the first number of threads to the first even plurality of parallel execution slices over a routing network that directs an output of the plurality of dispatch queues to the first even plurality of parallel execution slices;

executing the first number of threads on the first even plurality of parallel execution slices configured to independently execute the first even plurality of threads and having a first plurality of register files coupled to the first even plurality of parallel execution slices by a plurality of read buses, wherein the first even plurality of parallel execution slices are organized in pairs;

providing read access to a first one of a pair of the even plurality of parallel execution slices to a corresponding first one of the register files over a first read bus coupling the first one of the pair of the even plurality of parallel execution slices to the first one of the register files;

providing read access to a second one of the pair of the even plurality of parallel execution slices to a corresponding second one of the register files over a second read bus coupling the second one of the pair of the even plurality of parallel execution slices to the second one of the register files;

providing read access to the first one of a pair of the even plurality of parallel execution slices to the second one of the register files over the first read bus so that the first register file is shared by the first one of the pair of the even plurality of parallel execution slices and the second one of the pair of the even plurality of parallel execution slices, wherein the second read bus provides read access only to the second execution slice and is not coupled to the first execution slice so that the second register file is not shared with the first execution slice; and writing results of the execution of the first number of threads to a set of register files associated with the first even plurality of parallel execution slices including the first register file and the second register file.

2. The method of claim 1, wherein the first register file is configured to support instructions of doubled size as the instructions of one of the pair of the even plurality of parallel execution slices.

3. The method of claim 1, wherein the pair of parallel execution slices is configured to execute instructions on at least one of the parallel execution slices of the pair of the even plurality of parallel execution slices.

4. The method of claim 1, wherein the routing network is configured to dynamically control operations between the plurality of dispatch queues and the even plurality of parallel execution slices based, at least in part, on:
   resource availability in the even plurality of parallel execution slices; and
   execution requirements for the first even plurality of threads.

5. The method claim 1, wherein the first number of threads are mapped to one or more sets of the first even plurality of parallel execution slices.

6. The method of claim 1, further comprising managing a transition between the receiving the first number of threads and receiving a second number of threads, and mapping the first number of threads to the first even plurality of parallel execution slices and a second number of threads to a second even plurality of execution slices.

7. A method comprising:
receiving, from a dispatch queue, a first number of threads;
allocating, by a network, the received first number of threads to a first even plurality of parallel execution slices;
executing the first number of threads on the first even plurality of parallel execution slices;
writing results of the execution of the first number of threads to a set of register files associated with the first even plurality of parallel execution slices;
receiving, from the dispatch queue, a second number of threads;
allocating, by the network, the received second number of threads to a second even plurality of parallel execution slices;
executing the second number of threads on the second even plurality of execution slices;
writing results of the execution of the second number of threads to a set of register files associated with the second even plurality of parallel execution slices;
determining the first number of threads is greater than the second number of threads; and
allocating data associated with the second number of threads to the set of register files associated with the second even plurality of parallel execution slices.

8. A method comprising:
receiving, from a dispatch queue, a first number of threads;
allocating, by a network, the received first number of threads to a first even plurality of parallel execution slices;
executing the first number of threads on the first even plurality of parallel execution slices, wherein the executing the first number of threads on the first even plurality of parallel execution slices further comprises determining whether instructions associated with the first number of threads comprise 64 bit wide instructions;
responsive to determining that instructions associated with the first number of threads comprise 64 bit wide instructions, executing the instructions associated with the first number of threads on a first execution slice of a pair of parallel execution slices;
writing results of instruction execution to the first execution slice of the pair of parallel execution slices and a second execution slice of the pair of parallel execution slices;
writing results of the execution of the first number of threads to a set of register files associated with the first even plurality of parallel execution slices;
receiving, from the dispatch queue, a second number of threads;
allocating, by the network, the received second number of threads to a second even plurality of parallel execution slices;
executing the second number of threads on the second even plurality of execution slices; and
writing results of the execution of the second number of threads to a set of register files associated with the second even plurality of parallel execution slices.

9. The method of claim 8, further comprising:
responsive to determining that instructions associated with the first number of threads do not comprise 64 bit wide instructions, determining whether instructions associated with the first number of threads comprise 128 bit wide instructions;

responsive to determining that instructions associated with the first number of threads comprise 128 bit wide instructions, executing the instructions associated with the first number of threads on a first execution slice and a second execution slice of a pair of parallel execution slices; and writing results of instruction execution to the first execution slice of the pair of parallel execution slices and the second execution slice of the pair of parallel execution slices.

\* \* \* \* \*